United States Patent
Mahgerefteh et al.

(10) Patent No.: US 10,473,858 B1
(45) Date of Patent: Nov. 12, 2019

(54) WAVEGUIDE ROUTING CONFIGURATIONS AND METHODS

(71) Applicant: Finisar Corporation, Sunnyvale, CA (US)

(72) Inventors: Daniel Mahgerefteh, Los Angeles, CA (US); Ying Luo, Sunnyvale, CA (US); Shiyun Lin, San Diego, CA (US); Jin-Hyoung Lee, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 16/271,471

(22) Filed: Feb. 8, 2019

(51) Int. Cl.
*G02B 6/12* (2006.01)
*G02B 6/14* (2006.01)
*G02B 6/125* (2006.01)
*G02B 6/122* (2006.01)

(52) U.S. Cl.
CPC .............. *G02B 6/14* (2013.01); *G02B 6/125* (2013.01); *G02B 6/1228* (2013.01); *G02B 2006/1209* (2013.01); *G02B 2006/12061* (2013.01); *G02B 2006/12119* (2013.01); *G02B 2006/12152* (2013.01)

(58) Field of Classification Search
None
See application file for complete search history.

(56) References Cited

U.S. PATENT DOCUMENTS

| | | | |
|---|---|---|---|
| 7,333,691 B1* | 2/2008 | Gill | B82Y 20/00 359/344 |
| 2006/0133754 A1* | 6/2006 | Patel | G02B 6/122 385/129 |
| 2010/0086255 A1* | 4/2010 | Ishizaka | G02B 6/1228 385/31 |
| 2010/0150500 A1* | 6/2010 | Pyo | G02B 6/12004 385/37 |
| 2014/0233881 A1* | 8/2014 | Hatori | G02B 6/1228 385/14 |
| 2016/0131837 A1* | 5/2016 | Mahgerefteh | G02B 6/124 385/14 |
| 2017/0199330 A1* | 7/2017 | Doany | G02B 6/126 |
| 2018/0059324 A1* | 3/2018 | Tu | G02B 6/34 |
| 2018/0231714 A1* | 8/2018 | Collins | G02B 6/12002 |
| 2018/0314005 A1* | 11/2018 | Lin | G02B 6/2773 |

\* cited by examiner

*Primary Examiner* — Michael Stahl
(74) *Attorney, Agent, or Firm* — Maschoff Brennan

(57) ABSTRACT

An optical waveguide may include a silicon portion and a silicon nitride portion positioned over the silicon portion. The silicon portion may include a taper that decreases a width of the silicon portion. The optical waveguide may include a transition between a loaded single mode or multimode waveguide to a single mode waveguide. The silicon nitride portion may confine optical signals traveling through the optical waveguide in the silicon portion.

19 Claims, 10 Drawing Sheets

WAVEGUIDE ROUTING CONFIGURATIONS AND METHODS

BACKGROUND

The present disclosure generally relates to waveguide routing configurations for silicon photonics devices.

Silicon photonics involve the use of silicon as an optical medium for optical or optoelectronic devices. In some photonics devices, the silicon may be positioned on top of a layer of silicon, such configurations are known as silicon on insulator (SOI). The silicon may be patterned into photonic components or micro-photonic components. Silicon photonic devices may be made using existing semiconductor fabrication techniques, and because silicon is already used as the substrate for some integrated circuits, it may be possible to create hybrid devices in which the optical and electronic components are integrated onto a single microchip.

Silicon photonic devices may be implemented in optical networks used to communicate optical signals for transmitting information among various nodes of a telecommunications network. To transmit data in an optical network, the data may be converted from an electrical signal to an optical signal using an optoelectronic device. Optical networks are one example of an environment where the silicon photonic devices described herein may be implemented. However, the concepts described may also be implemented in other circumstances. For example, silicon photonic devices may be implemented in computer processing, sensors, optical routing, signal processing or other suitable applications. The embodiments disclosed herein are not limited to any specific environment unless indicated by context.

The claimed subject matter is not limited to embodiments that solve any disadvantages or that operate only in environments such as those described above. This background is only provided to illustrate examples of where the present disclosure may be utilized.

SUMMARY

The present disclosure generally relates to silicon waveguide routing for silicon photonics devices.

In one example embodiment, an optical waveguide may include a silicon portion and a silicon nitride portion positioned over the silicon portion. The silicon portion may include a taper that decreases a width of the silicon portion. The silicon nitride portion may confine optical signals traveling through the optical waveguide in the silicon portion. The silicon nitride portion may extend along a length of the taper and may include a width that stays substantially the same along the length of the taper. The silicon portion may include a first width on a first side of the taper, and a second width on a second side of the taper opposite the first side. The taper may transition the optical waveguide between a loaded single mode or multimode waveguide to a single mode waveguide. The optical waveguide may transition between a loaded single mode or multimode waveguide to a single mode waveguide.

In some aspects, the silicon portion and the silicon nitride portion may be spaced apart from one another such that an optical mode in the silicon portion is confined laterally by the silicon nitride portion. The silicon portion and the silicon nitride portion may be spaced apart from one another. The silicon portion and the silicon nitride portion may extend substantially the same length of the optical waveguide. The taper may include a length that is sufficiently long enough to substantially avoid loss of optical signals travelling through the taper.

In some embodiments, the optical waveguide may include a bend positioned proximate the taper. The taper may change optical signals traveling through the optical waveguide from multimode to single mode to permit the optical signals to be routed through the bend. The silicon portion and the silicon nitride portion may extend through the bend. The taper may decrease a width of the silicon portion prior to the bend. The optical waveguide may include a buried oxide portion. The silicon nitride portion and the silicon portion may be positioned in the buried oxide portion.

In another example embodiment, an optical waveguide may include a transition between a loaded single mode or multimode waveguide to a single mode waveguide. The transition may include a silicon portion, a silicon nitride portion positioned over the silicon portion, and a taper decreasing a width of the silicon portion.

The optical waveguide may include a bend that changes the direction of the optical waveguide. The optical waveguide may include a second transition between a single mode waveguide to a loaded single mode or multimode waveguide. The second transition may include a second silicon portion, a second silicon nitride portion positioned over the silicon portion, and a second taper increasing a width of the second silicon portion. The silicon nitride portion may confine optical signals traveling through the optical waveguide in the silicon portion. The silicon nitride portion may extend along a length of the taper and may include a width that stays substantially the same along the length of the taper, and the length of the taper may be sufficiently long to substantially avoid loss of optical signals travelling through the taper.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

DETAILED DESCRIPTION

Figure 1:
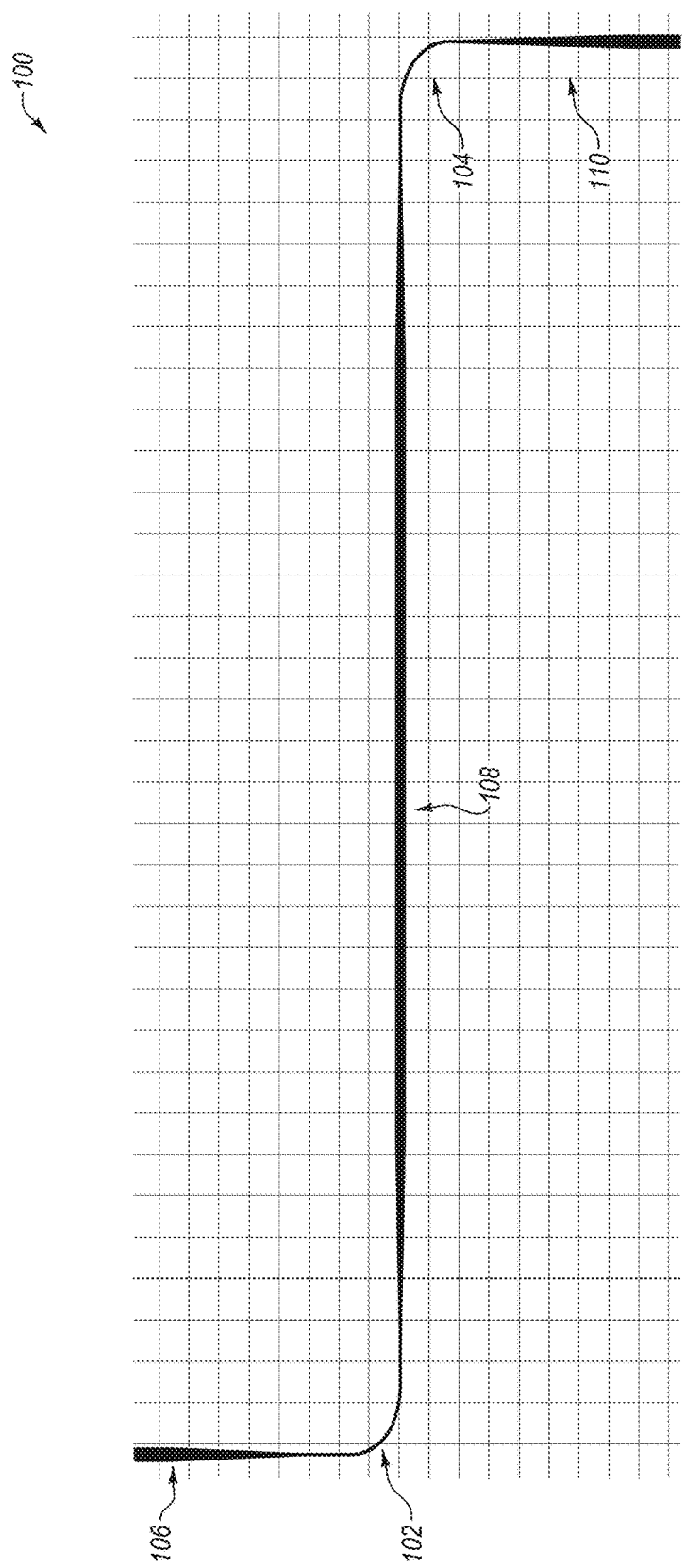
FIG. 1 is a schematic side view of an example of a waveguide.

The present disclosure generally relates to silicon waveguide routing for silicon photonics devices.

Silicon photonics involve the use of silicon as an optical medium for optical or optoelectronic devices. In some photonics devices, the silicon may be positioned on top of a layer of silicon, such configurations are known as silicon on insulator (SOI). The silicon may be patterned into photonic components or micro-photonic components. Silicon photonic devices may be made using existing semiconductor fabrication techniques, and because silicon is already used as the substrate for some integrated circuits, it may be possible to create hybrid devices in which the optical and electronic components are integrated onto a single microchip.

Silicon waveguides may be included in silicon photonic devices to transmit or route optical signals. Additionally or alternatively, silicon waveguides may be used to transmit or route optical signals between different silicon photonic devices. Typically, waveguides include a core surrounded by a cladding. Depending on the configuration of the waveguide, optical signals travelling through the waveguide may be decreased or lost for various reasons. For example, optical signals traveling through silicon waveguides may experience scattering loss or propagation loss.

In some configurations, waveguides may include curves, arcs, or bends to change the direction of the optical signals traveling through the waveguides and/or to direct the optical signals to specific areas or components (e.g., to optically couple different optical components). However, bends may also result in scattering loss or propagation loss.

In particular, silicon waveguides may have a relatively high contrast between the refractive index of the core of the waveguide and the cladding of the waveguide, which in turn may result in scattering loss at the interface or boundary between the core and the cladding. In some circumstances, propagation loss in a single mode sub-micron silicon waveguide may be around 2 dB/cm. Thus, due to the high refractive index contrast at the cored and cladding boundary, the propagation loss of the routing path of the waveguide, even in multi-mode waveguide designs, may be relatively high for large-scale silicon photonic networks.

To decrease propagation loss, some silicon waveguide configurations implement thicker waveguides or thicker SOI's to better confine the mode of the optical signals within the core of the waveguide, and thus minimize the optical overlap at the boundary. In one example, a waveguide or SOI with a thickness of approximately 3 µm may result in a propagation loss of 0.1 dB/cm. However, larger or thicker waveguides may take up more space than smaller or thinner waveguides. In addition, thicker waveguides may result in lower waveguide density, because a smaller amount of waveguides may fit in a given area. Furthermore, thicker waveguides may require relatively larger bends to avoid scattering loss, which may also increase the amount of space that the waveguide requires (e.g., resulting in a larger footprint), and decreases the waveguide density in an optical device.

In other circumstances, various manufacturing techniques such as wet oxidation and/or stripping may be used to smooth the sidewalls of waveguides. In another example, immersion lithography may be used to reduce scattering loss by improving the line edge roughness of the waveguide. Such configurations may improve confinement of the optical signals and decrease scattering loss, but may increase fabrication complexity and manufacturing costs.

Accordingly, the present disclosure relates to waveguide configurations that result in low scattering and propagation loss. Such configurations may be cost effective to implement and may not require expensive and complicated manufacturing techniques. In addition, such configurations may be used to provide low loss or no loss transitions between multimode and single mode waveguides, which in turn may be implemented in curves, arcs, or bends for waveguide routing.

Some embodiments include silicon nitride strip loaded waveguides for silicon photonics, which may be implemented in silicon photonic devices or networks. As used herein, a silicon nitride strip loaded waveguide refers to a waveguide with a silicon nitride strip over or on top of a silicon slab. In such configurations, a silicon nitride strip may be located over or on top of an SOI layer, resulting in relatively high optical confinement (and low propagation loss) in the core of the waveguide without requiring an etching step or other expensive and complicated manufacturing techniques. The mode of the optical signals traveling through the loaded waveguide may be confined mainly in the silicon layer or slab and will not be subject to any scattering loss due to etched silicon sidewall roughness, for example, as compared to regular silicon waveguides. Alternatively, the mode of the optical signals traveling through the loaded waveguide will experience very small scattering loss on the sidewall of the silicon nitride strip. The optical signal may have a very small overlap with the sidewall of the silicon nitride, so the scattering loss of the loaded waveguide may be much smaller than a regular silicon waveguide.

In some configurations, the disclosed embodiments may be formed by low resolution lithography. In particular, the strip loaded waveguide may be formed using low resolution lithography. Such configurations may not require high resolution lithography, wet lithography, or sidewall oxidation, which may dramatically reduce fabrication costs. In addition, the disclosed embodiments may be relatively robust to processing errors or processing variations, such as variations in refractive index, layer thickness and gap control between silicon nitride and silicon. In some examples, the disclosed embodiments may be implemented in silicon waveguide-based multiplexers or demultiplexers, arrayed waveguide gratings, cascaded Mach-Zehnder interferometers, or other optical devices to significantly reduce phase errors.

Although silicon nitride strip loaded waveguides are used as an example, the concepts and configurations described may be implemented with other suitable materials. In particular, the disclosed configurations may be implemented with any compatible materials that include suitable refractive indices.

FIG. 1 is a schematic side view of an example of a waveguide 100. The waveguide 100 includes a first curve, arc, or bend 102 and a second curve, arc, or bend 104. A first substantially straight portion 106 may be positioned prior to the bend 102, a second substantially straight portion 108 may be positioned between the bend 102 and the bend 104, and a third substantially straight portion 110 may be after the bend 104.

In the illustrated configuration, the bend 102 changes the direction of the waveguide 100 from a first direction at the portion 106 to a second direction transverse to the first direction at the portion 108. As shown, the second direction may be perpendicular to the first direction, although other configurations may be implemented. The bend 104 changes the direction of the waveguide 100 from the second direction at the portion 108 to a third direction at the portion 110, with the third direction being transverse to the second direction. As shown, the third direction may be perpendicular to the second direction, although other configurations may be implemented. In the configuration shown, the first direction is substantially perpendicular to the third direction. The portion 110 extends parallel to the portion 106. The portion 108 extends transverse to or perpendicular to the portions 106 and 110.

The waveguide 100 may be a single mode silicon nitride loaded waveguide with single mode transitions at the bends 102 and 104. In particular, the portion 106 may include a single mode silicon nitride loaded waveguide. The waveguide 100 may transition from the single mode silicon nitride loaded waveguide at the portion 106 to a single mode waveguide before the bend 102. The bend 102 may include a single mode waveguide. After the bend 102, the waveguide 100 may transition back to a single mode silicon nitride loaded waveguide at the portion 108. The waveguide 100 may transition from the single mode silicon nitride loaded waveguide at the portion 108 to a single mode waveguide before the bend 104. The bend 104 may include a single mode waveguide. After the bend 104, the waveguide 100 may transition back to a single mode silicon nitride loaded waveguide at the portion 110.

The waveguide 100 may be a multimode waveguide with single mode transitions at the bends 102 and 104. In particular, the portion 106 may include a multimode waveguide. The waveguide 100 may transition from the multimode waveguide at the portion 106 to a single mode waveguide before the bend 102. The bend 102 may include a single mode waveguide. After the bend 102, the waveguide 100 may transition back to a multimode waveguide at the portion 108. The waveguide 100 may transition from the multimode waveguide at the portion 108 to a single mode waveguide before the bend 104. The bend 104 may include a single mode waveguide. After the bend 104, the waveguide 100 may transition back to a multimode waveguide at the portion 110.

Implementing silicon nitride loaded single mode waveguides or multimode waveguides with single mode bends, such as the configuration of the waveguide 100, may be used for relatively low propagation loss routing on submicron SOI platforms. In the illustrated configuration, the propagation loss through the waveguide 100 may be around 0.2 dB/cm, without including propagation losses caused by tapers and bending of the waveguide (e.g., as compared to a regular waveguide, which may result in propagation losses of 2 dB/cm). For relatively thinner waveguides or SOI platforms, regular silicon waveguide may have high propagation losses due to reduced overall confinement of optical signals travelling through the waveguide. Such levels of propagation losses may be too high to be implemented in large scale silicon photonic networks, because waveguide routing lengths can be large (e.g., tens of centimeters), and thus the resulting propagation losses would be too high. Accordingly, it may be desirable to implement configurations with lower levels of propagation loss, such as the silicon nitride loaded waveguide configuration of the waveguide 100, for large scale silicon photonic networks or other applications.

Figure 2:
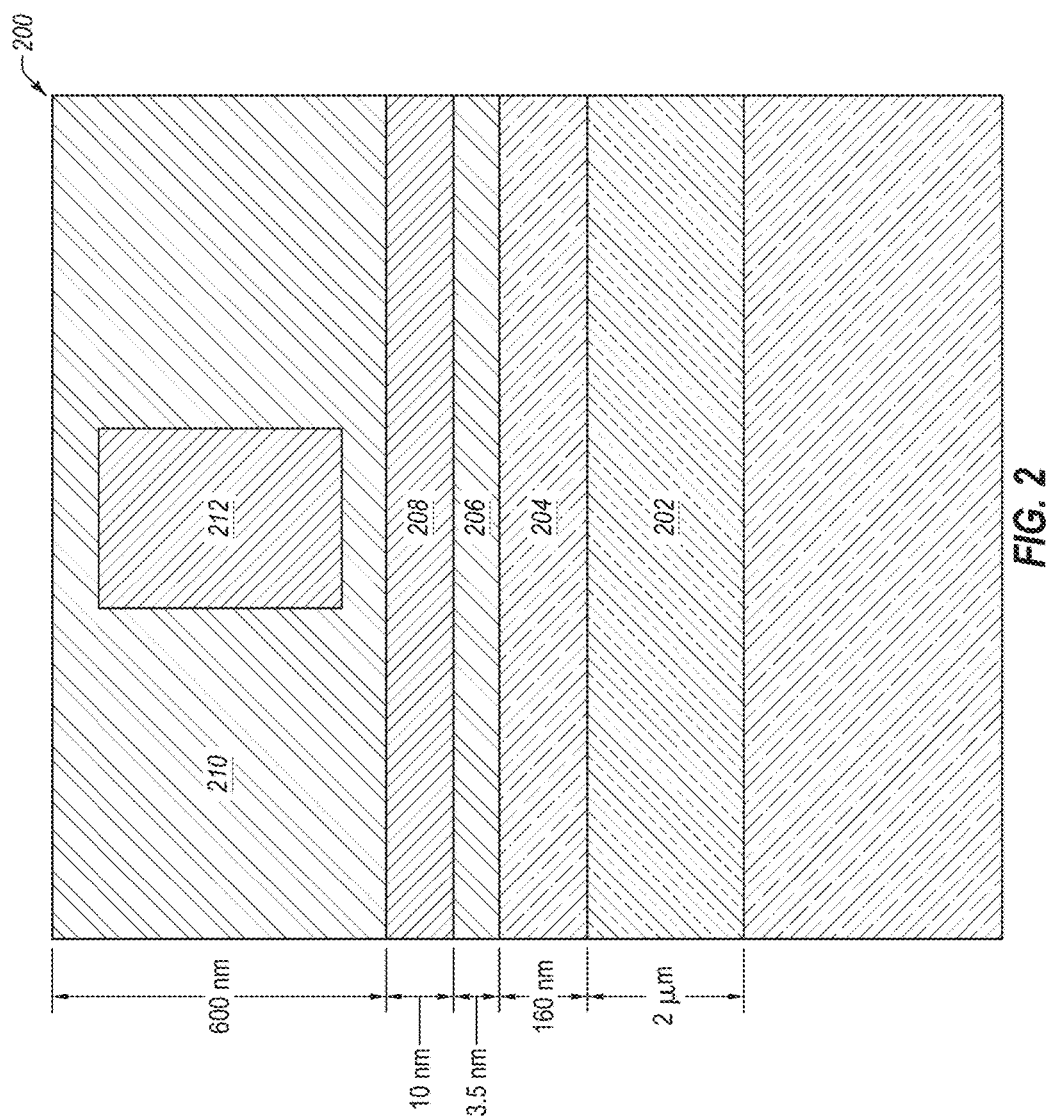
FIG. 2 is a schematic cross section view of an example of a waveguide.

FIG. 2 is a schematic cross section view of an example of a waveguide 200. The waveguide 200 may include a buried oxide (BOX) layer 202, a silicon layer 204, an oxide layer 206, a silicon nitride layer 208, an oxide cladding 210 and a silicon nitride strip portion 212. As shown, the silicon nitride strip portion 212 may be positioned in and surrounded by the oxide cladding 210 (e.g., oxide gate or oxide layer). The BOX layer 206 that may include silicon dioxide (SiO2) or other suitable oxide.

In the illustrated example, the height of the BOX layer 202 may be 2 µm, the height of the silicon layer 204 may be 160 nm, the height of the oxide layer 206 may be 3.5 nm, the height of the silicon nitride layer 208 may be 10 nm, and the height of the oxide gate 210 may be 600 nm, although other configurations may be implemented. The BOX layer 202 may include a refractive index of 1.453, the silicon layer 204 may include a refractive index of 3.476, the oxide layer 206 may include a refractive index of 1.452, the silicon nitride layer 208 may include a refractive index of 1.933, the oxide cladding 210 may include a refractive index of 1.454 and the silicon nitride strip portion 212 may include a refractive index of 1.928. The silicon layer 204 may be a core layer with a majority of the optical mode confined in the silicon layer 204. The silicon nitride strip portion 212 may be patterned and may provide confinement for the optical mode in a manner similar to a rib waveguide. The intermediate layers including the silicon nitride layer 208 and the oxide layer 206 may be included to comply with process or manufacturing requirements.

In typical waveguide configurations, the silicon layer may be etched to confine the optical signals traveling through the waveguide. However, the disclosed embodiments include configurations that do not require etching in a silicon layer 204.

Figure 3:
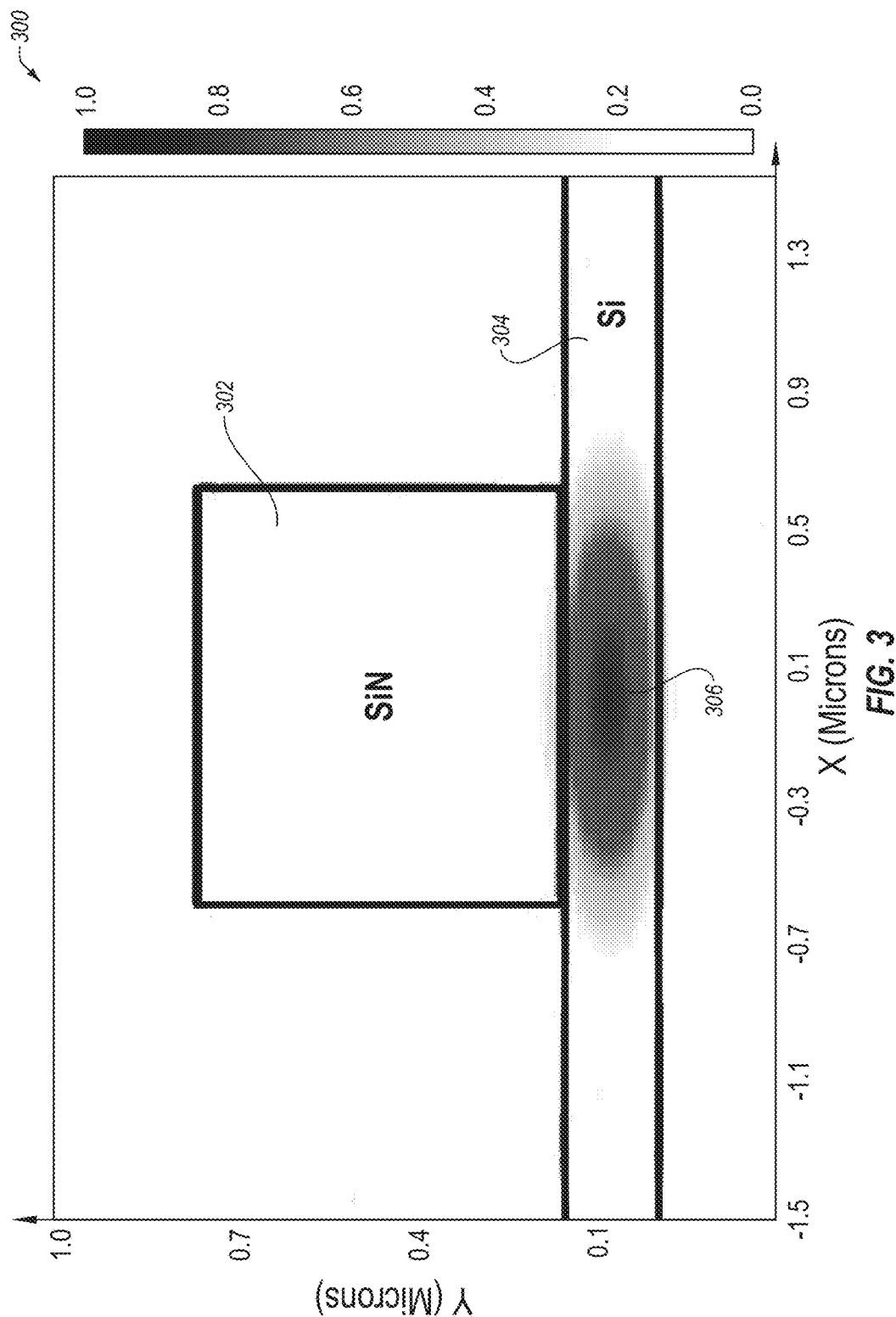
FIG. 3 illustrates the optical mode field distribution of an example waveguide.

FIG. 3 illustrates the optical mode field distribution of an example waveguide 300. The waveguide 300 may include any suitable aspects described with respect to the waveguide 200 of FIG. 2. As illustrated, the waveguide 300 includes a silicon portion 304 and a silicon nitride portion 302 positioned over the silicon portion 304. In FIG. 3, the X axis represents dimensions of the waveguide in microns in a first direction, and the Y axis represents dimensions of the waveguide in microns in a second direction. FIG. 3 also illustrates the mode intensity of optical signals 306 traveling through the waveguide 300, as indicated by the scale 0.0-1.0.

In the illustrated configuration, the silicon nitride portion 302 is implemented to reduce propagation loss of the optical signals 306 travelling through the silicon portion 304. In particular, the silicon nitride portion 302 is positioned over the silicon portion 304 such that the mode of the optical signals will be confined in the silicon portion 304 because silicon has a higher index of refraction in comparison to silicon nitride. In effect, the silicon nitride portion 302 together with the silicon portion 304 may act as a rib waveguide. In such configurations, no etching is needed in the silicon portion 304 because the lateral confinement is provided by the top silicon nitride portion 302. In such configurations, the optical signals 306 travelling through the silicon portion 304 experience substantially no scattering loss.

In some configurations, the silicon portion 304 and the silicon nitride portion 302 may be spaced apart from one another (see, for example, FIG. 2). When the gap between silicon portion 304 and the silicon nitride portion 302 is small enough, there are more interactions between the two materials. In such configurations, a smaller gap between the silicon nitride portion 302 and the silicon portion 304 may be implemented to ensure the optical mode in the silicon layer may be confined laterally by the silicon nitride portion 302.

Figure 4A:
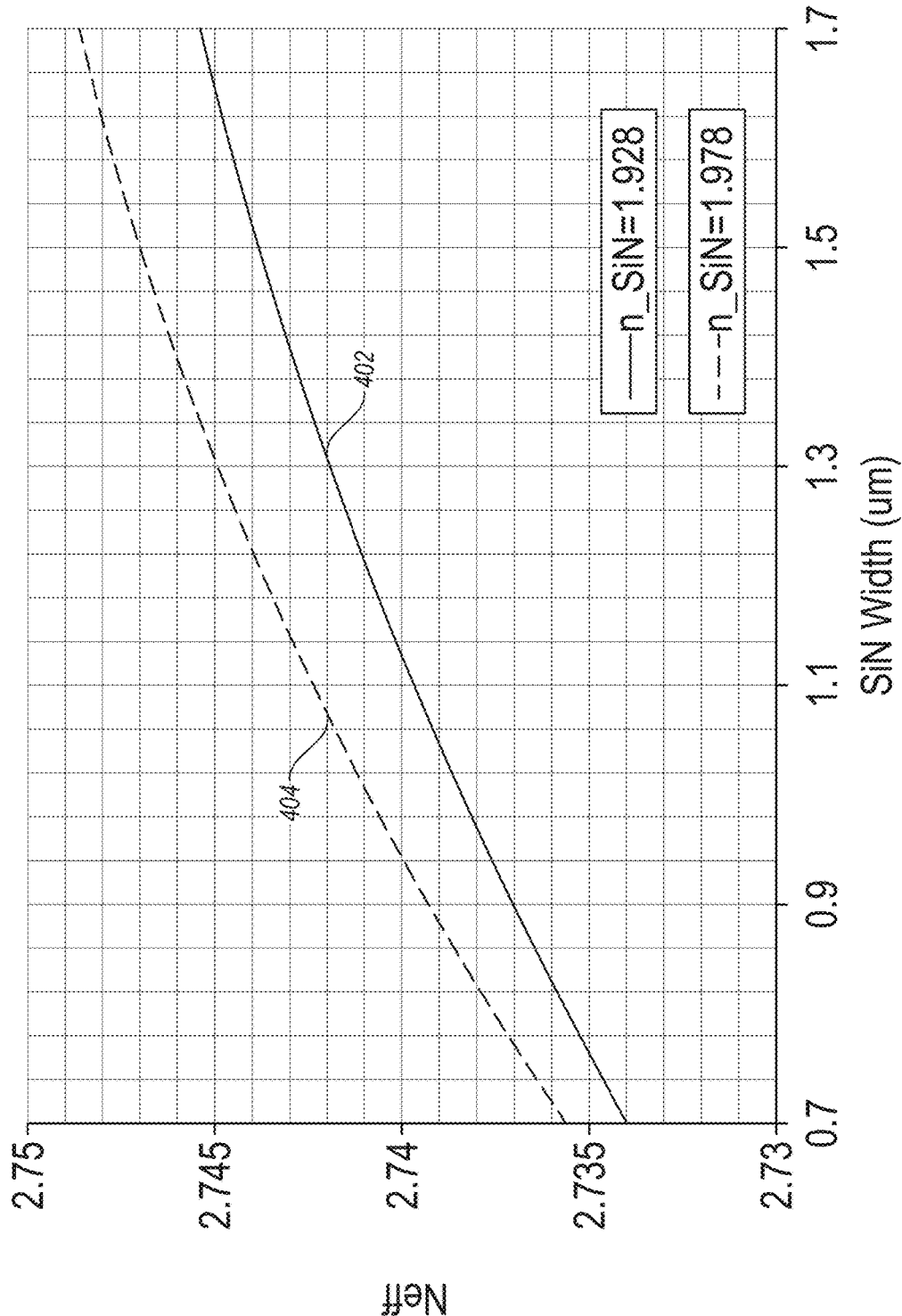
FIGS. 4A-4C are graphs of the effective index of the waveguide for different configurations of silicon nitride.
Figure 4B:
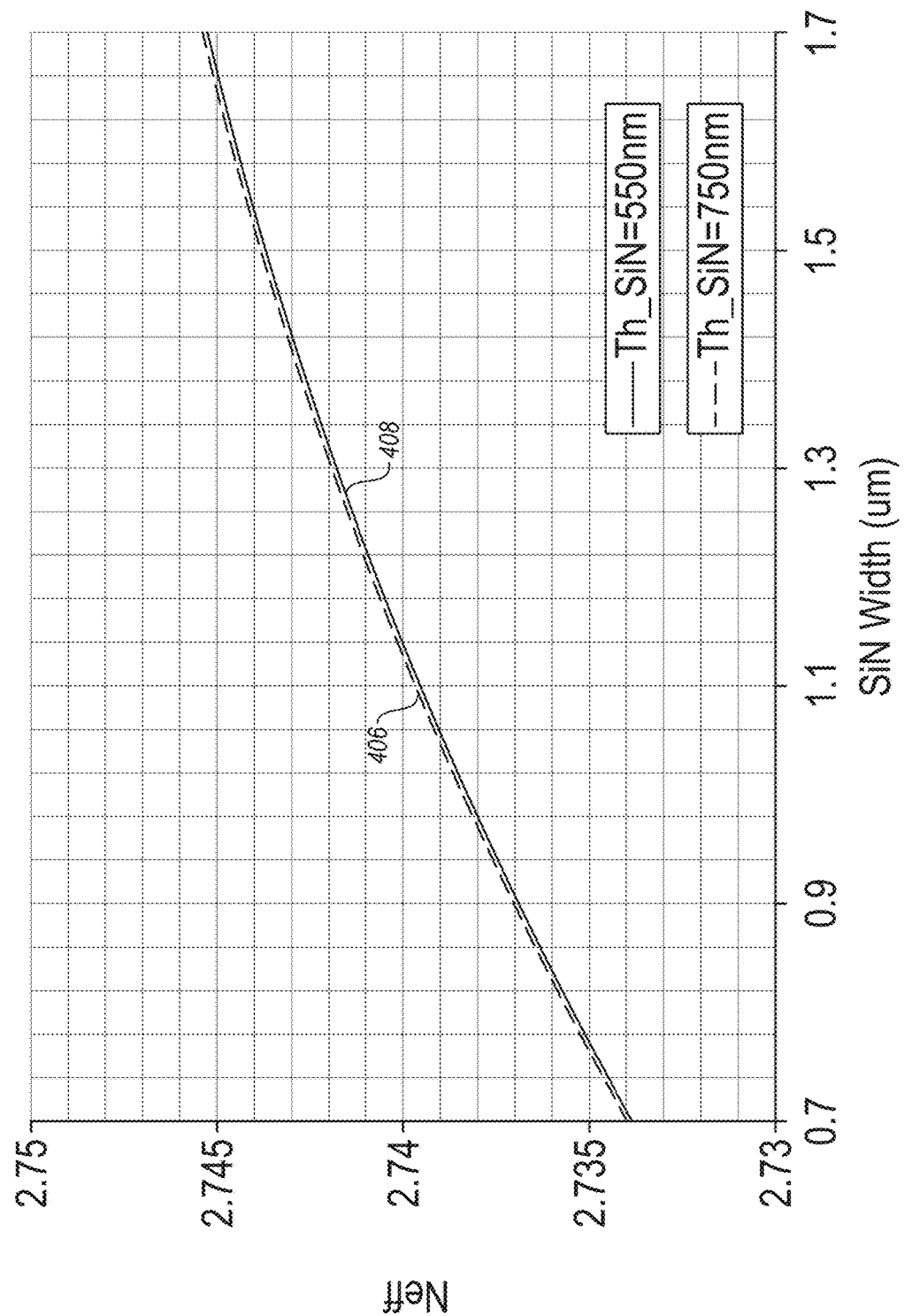
Figure 4C:
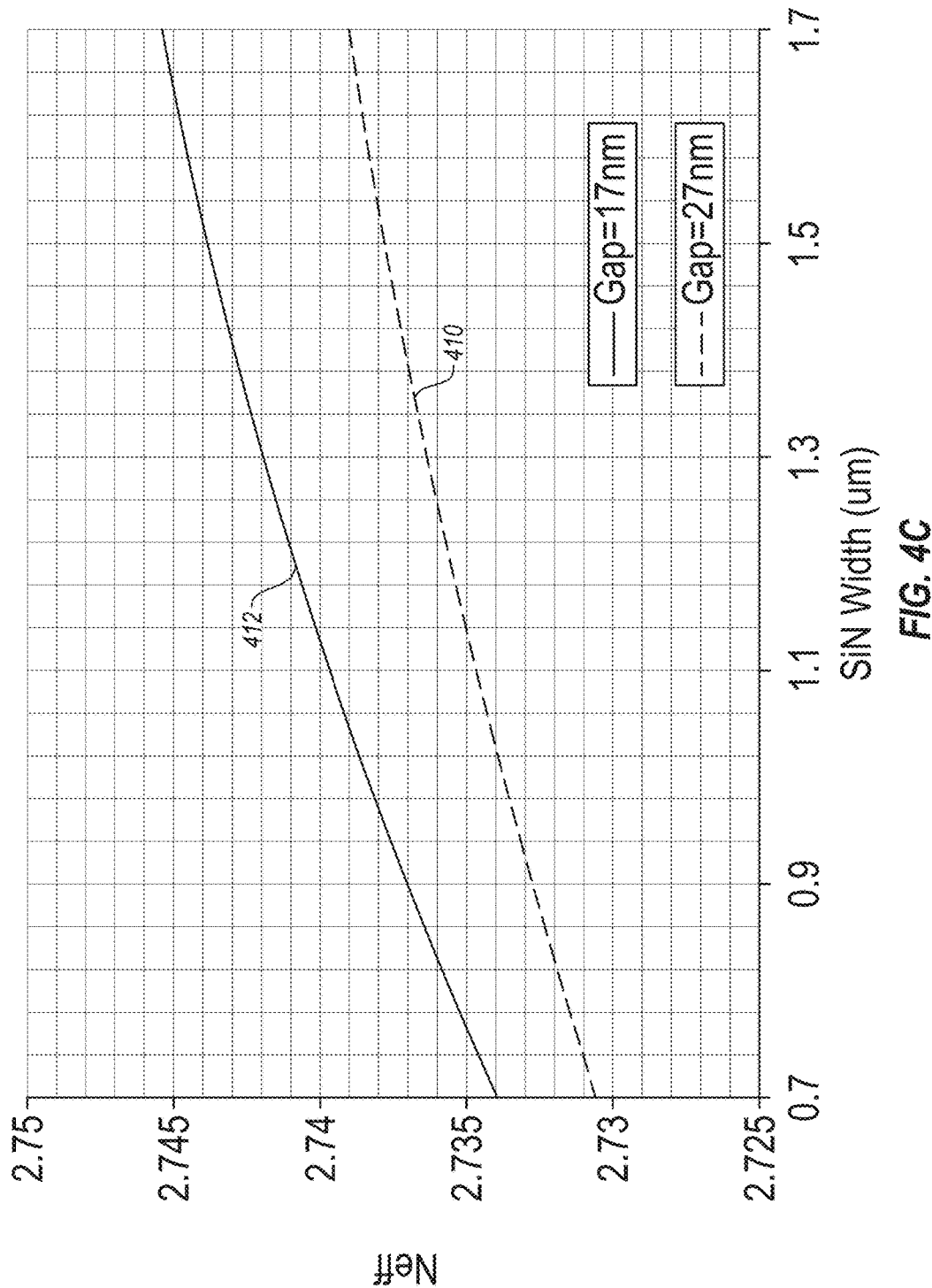

FIGS. 4A-4C are graphs of the effective index of the waveguide for different configurations of silicon nitride. In particular, FIGS. 4A-4C may represent the effective index of the optical mode in the silicon portion 304 of FIG. 3, for different configurations of silicon nitride portion 302. In FIGS. 4A-4C, the X axis may represent the width of the silicon nitride in microns and the Y axis may represent the effective index of the optical mode in the silicon nitride loaded waveguide.

As indicated in FIGS. 4A-4C, the effective index of the optical mode is very tolerant to process variations and/or characteristic changes in silicon nitride. In particular, since the mode of the optical signals is confined in the silicon 306, the effective index of the waveguide is very tolerant (e.g., changes very little) when the characteristics of the silicon nitride are varied.

FIG. 4A illustrates the difference in the effective index of the waveguide for silicon nitride with an index of 1.928, denoted at 402, versus silicon nitride with an index of 1.978, denoted at 404. As shown, for an index change of 0.05, the effective index optical mode changes less than 0.0004.

FIG. 4B illustrates the difference in the effective index of the waveguide for silicon nitride with thickness of 550 nm, denoted at 406, versus silicon nitride with a thickness of 750 nm, denoted at 408. As shown, for a thickness change of 200 nm, the effective index optical mode changes less than 0.0002.

FIG. 4C illustrates the difference in the effective index of the waveguide for different gap sizes between silicon nitride and silicon. For example, the gap may be the gap between the silicon nitride strip portion 212 and the silicon layer 204 of FIG. 2. In particular, FIG. 4C illustrates the difference in the effective index of the waveguide for a gap of 17 nm, denoted at 412 versus a gap size of 27 nm, denoted at 410. As shown, for a gap size change of 10 nm, the effective index optical mode changes less than 0.007.

Characteristics of the silicon nitride, such as its thickness, index, and gap size, may be different from process variations in forming the waveguide. However, as shown in FIGS. 4A-4C, since the mode of the optical signals is confined to the silicon, the effective index of the waveguide changes very little when the characteristics of the silicon nitride are varied.

Figure 4D:
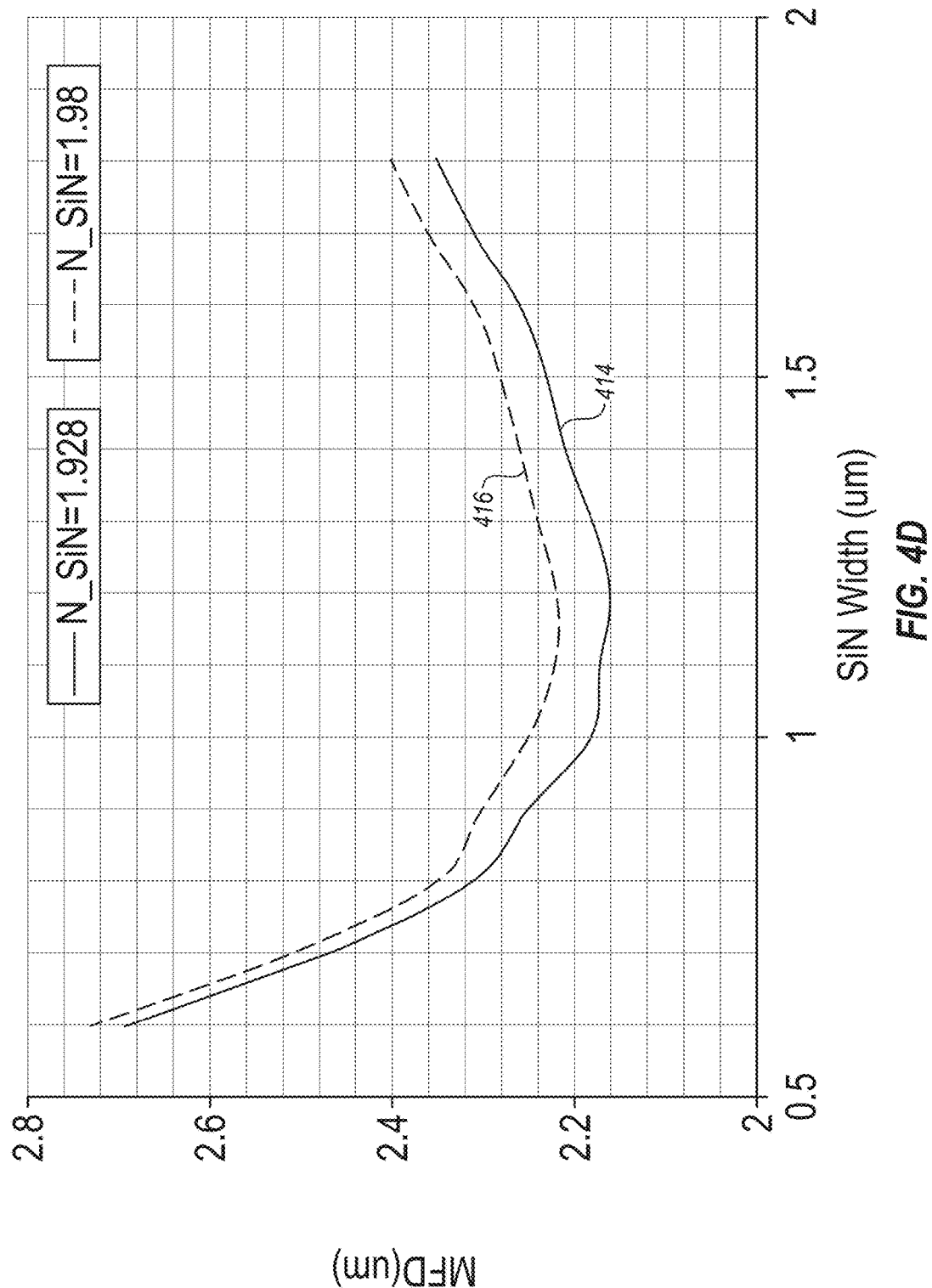
FIG. 4D is a graph of the mode field diameter versus the width of silicon nitride for different silicon nitride indexes.

FIG. 4D is a graph of the mode field diameter versus the width of silicon nitride for different silicon nitride indexes. In particular, the X axis is the width of the silicon nitride in microns, and the Y axis is the mode field diameter in microns. FIG. 4D illustrates the difference in the mode field diameter for silicon nitride with an index of 1.928, denoted at 414, versus the mode field diameter for silicon nitride with an index of 1.98, denoted at 416. As shown in FIG. 4D, the optical mode field diameter is mostly determined by silicon nitride width and silicon thickness, and is less affected by silicon nitride index and silicon nitride thickness. As shown, the mode field diameter is smallest when the width of the silicon nitride is 1.2 um.

Figure 5:
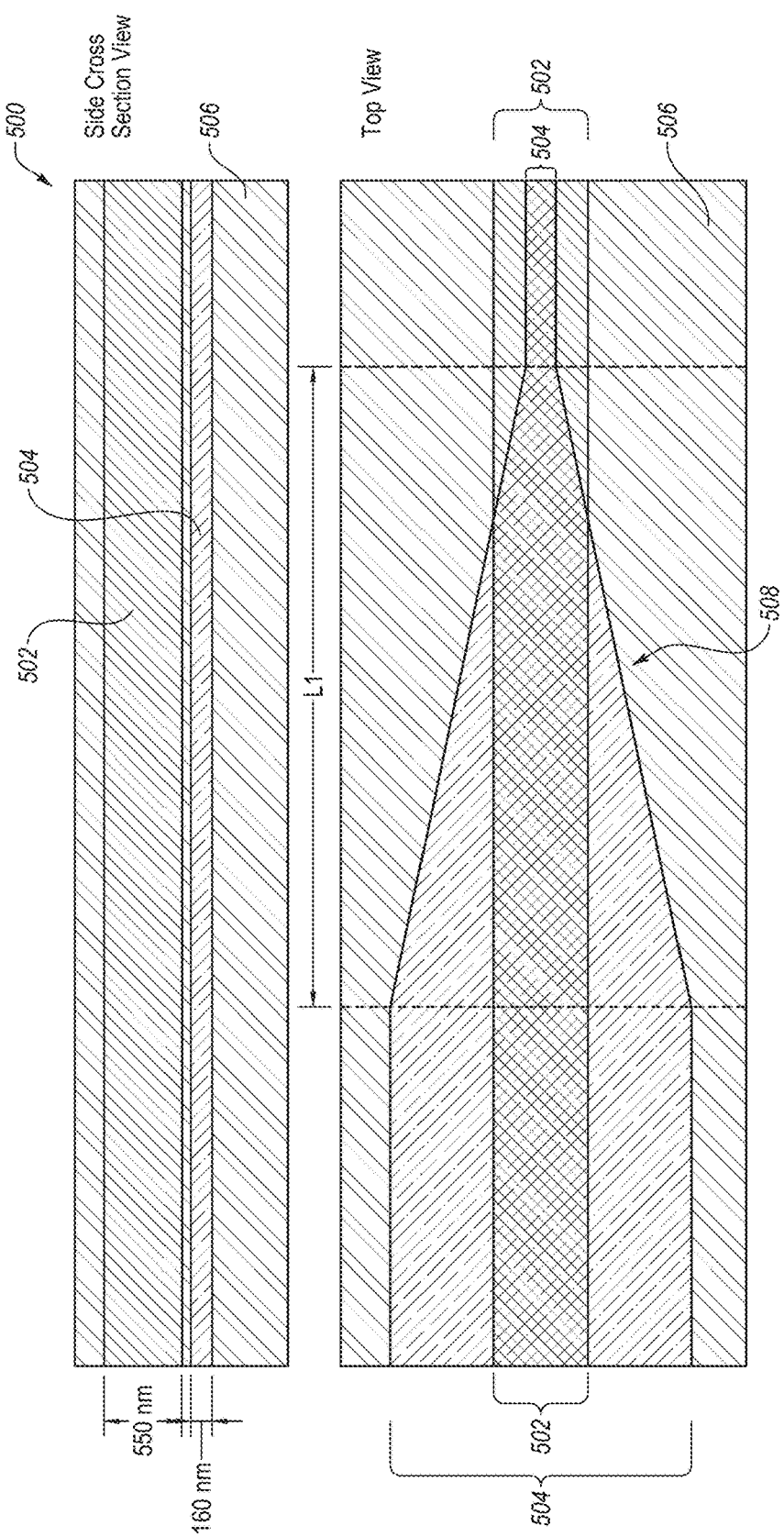
FIG. 5 is a schematic cross section view and a top view of an example of a waveguide transition configuration.

FIG. 5 is a schematic cross section view and a top view of an example of a waveguide transition 500 configuration. In particular, the upper portion of FIG. 5 includes a side cross section view and the lower portion of FIG. 5 is a top view of the waveguide transition 500. As illustrated, the transition 500 may include a silicon nitride portion 502 and a silicon portion 504. The silicon nitride portion 502 may be positioned over the silicon portion 504 as shown, for example, in the side cross section view. The waveguide transition 500 may include a buried oxide (BOX) portion 506, with the silicon nitride portion 502 and the silicon portion 504 positioned therein.

As shown in the side cross section view, in some configurations the silicon nitride portion 502 may include a height of 550 nm and the silicon portion 504 may include a height of 160 nm, although other configurations may be implemented. As shown in the top view, the silicon nitride portion 502 may extend the length of the waveguide transition 500, and may include a width that stays substantially the same along the length of the waveguide transition 500. The silicon portion 504 includes a taper 508 such that the width of the silicon portion 504 decreases along the length of the waveguide transition 500. In particular, the silicon portion 504 includes a first width on a first side of the taper 508, and a second width on a second side of the taper 508, opposite the first side. As shown, the first width may be larger than the second width, and the taper 508 may decrease the width of the silicon portion 504.

The waveguide transition 500 may permit a waveguide to transition between a loaded single mode or multimode waveguide to a single mode waveguide. In some configurations, the waveguide transition 500 may permit a waveguide to transition between a loaded multimode waveguide to a single mode waveguide to permit the waveguide to be routed through a curve, arc, or bend, as will be described in further detail below. Additionally or alternatively, the waveguide transition 500 may permit a waveguide to transition between a single mode waveguide to a loaded single mode or multimode waveguide after the waveguide is routed through a curve, arc, or bend.

The waveguide transition 500 does not require a change or taper in the silicon nitride portion 502, and includes a single taper (e.g., the taper 508) in the silicon portion 504, and therefore may be relatively simple to manufacture.

When optical signals travel through the waveguide transition 500, the silicon nitride portion 502 may confine the optical signals in the loaded waveguide before the taper 508, the taper 508 may change the optical signals from loaded to single mode in the silicon portion 504, to permit the waveguide to be routed through a curve, arc, or bend. Accordingly, the taper 508 may convert the mode of the optical signals from multimode to single mode.

The silicon portion 504 may be fully etched on the edge. For example, the silicon portion 504 may include an etch that is 160 nm deep. The output after the taper 508 may be a single mode strip silicon waveguide. The silicon portion 504 may be partially etched on the sides. For example, the silicon portion 504 may include an etch that is 110 nm deep on the sides. The output after the taper 508 may be a single mode rib silicon waveguide, for example, with a 50 nm thick slab on both sides of the waveguide.

The taper 508 may include a length L1. The length L1 may be selected to be sufficiently long enough to avoid loss of the optical signals travelling through the taper 508. In one example, the taper 508 may include a length of 60 microns or greater, or 100 microns or greater, to avoid loss of the optical signals travelling through the taper 508.

Figure 6:
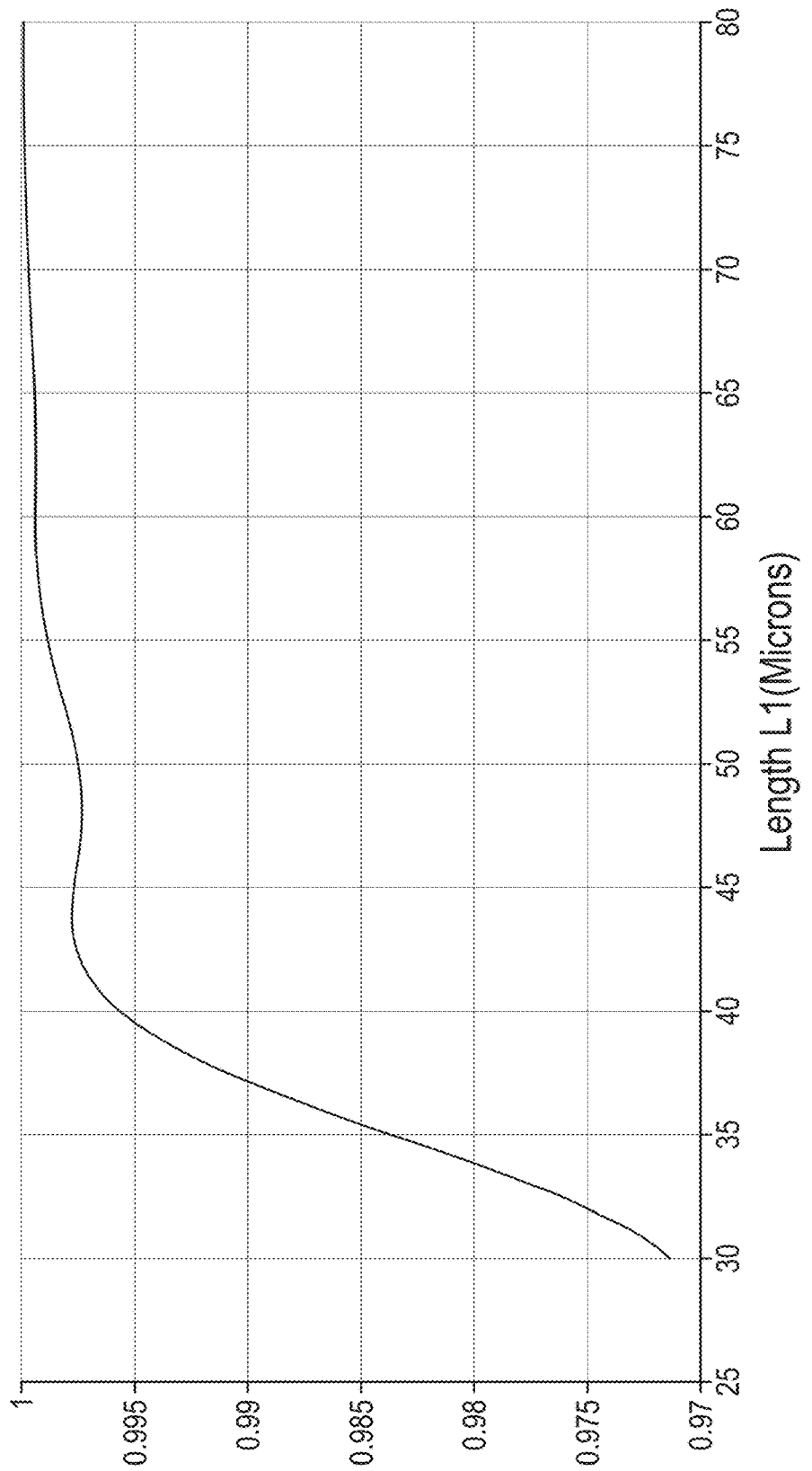
FIG. 6 is a graph of a fraction of optical signals transmitted through a waveguide transition versus length of a taper.

FIG. 6 is a graph of the fraction of optical signals transmitted through the waveguide transition 500 versus the length L1 of the taper 508. In particular, the Y axis represents the fraction of optical signals transmitted (e.g., with 1 being all of the signals transmitted), and the X axis is the length L1 of the taper 508. As shown in FIG. 6, loss can be minimized by increasing the length of the transition, and at lengths of 60 microns or higher, the fraction of signals transmitted is close to 1, so almost all of the optical signals are transmitted through the waveguide transition 500 in such configurations.

Figure 7:
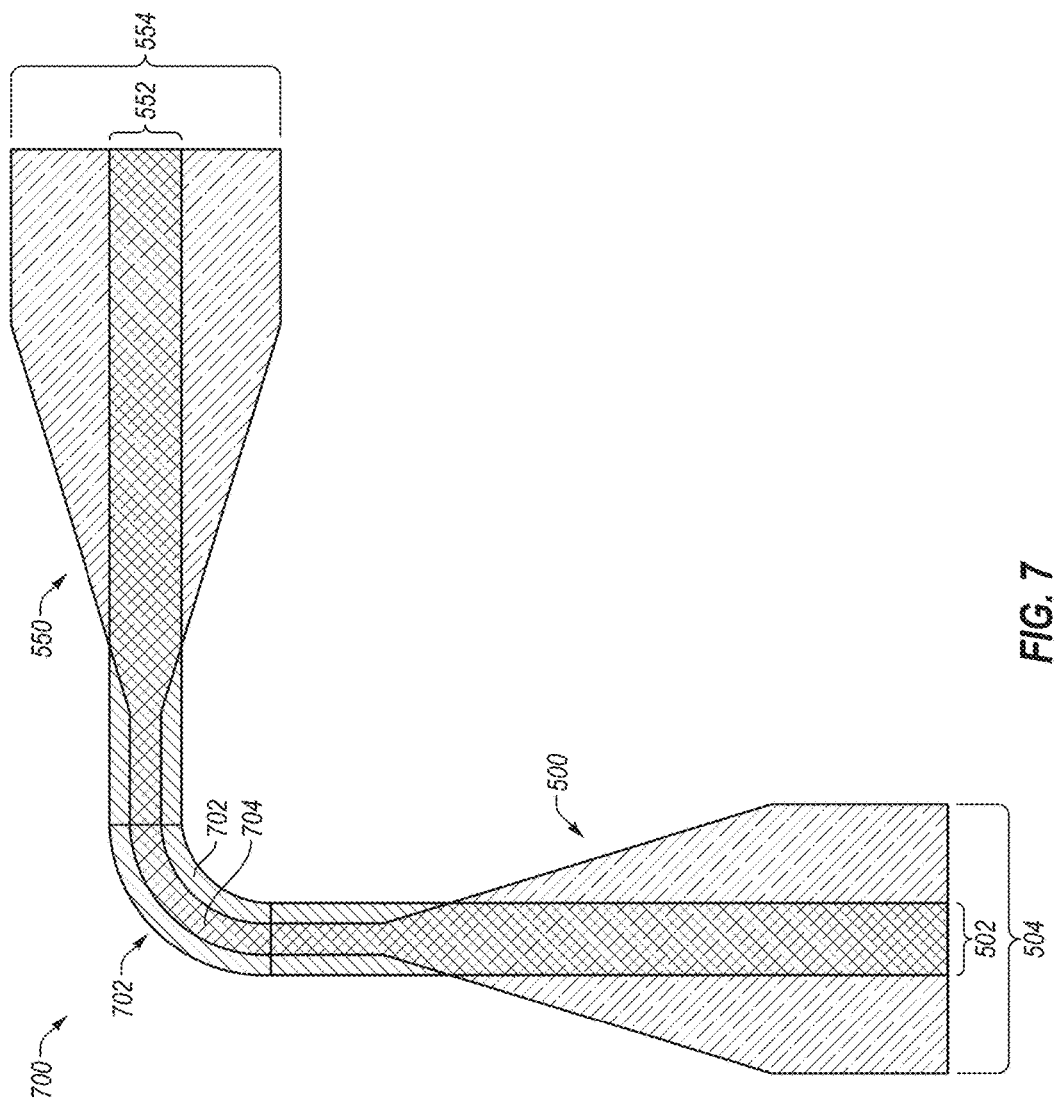
FIG. 7 is a schematic top view of an example of a waveguide implementing the waveguide transition of FIG. 5.

FIG. 7 is a schematic top view of an example of a waveguide 700 implementing the waveguide transition 500 of FIG. 5. As illustrated, the waveguide 700 includes a curve, arc, or bend 702 positioned in between substantially straight portions before and after the bend 702. The waveguide 700 includes the waveguide transition 500 of FIG. 5 to change the optical signals from multimode to single mode to permit the optical signals to be routed through the bend 702. The waveguide 700 also includes a second waveguide transition 550, which includes a silicon nitride portion 552 and a silicon portion 554. The waveguide transition 550 may include any of the aspects described with respect to the waveguide transition 500. However, the waveguide transition 550 may change the optical signals from single mode optical signals to loaded waveguide optical signals after the bend 702.

For example, the waveguide transition 550 may include a taper such that the width of the silicon portion 554 increases along the length of the waveguide transition 550. In particular, the silicon portion 554 includes a first width on a first side of the taper, and a second width on a second side of the taper, opposite the first side. The first width may be smaller than the second width, and the taper may increase the width of the silicon portion 554. In such configurations, the taper may change the optical signals from single mode optical signals to loaded waveguide optical signals after the bend 702. Accordingly, the transition 550 may change the optical waveguide between a single mode waveguide to a loaded single mode or multimode waveguide.

In such configurations, the waveguide 700 may be routed as desired, for example, with curves, arcs, or bends. In addition, such configurations may be used to provide low loss or no loss transitions between multimode and single mode waveguides, which in turn may be implemented in conjunction with curves, arcs, or bends for waveguide routing. Such configurations may be cost effective to implement and may not require expensive and complicated manufacturing techniques.

In addition, the configuration of the waveguide 700 may result in relatively high optical confinement (and low propagation loss) in the core of the waveguide 700 without requiring an etching step or other expensive and complicated manufacturing techniques. In such configurations, the mode of the optical signals traveling through the waveguide 700 will be confined and will not experience any substantial scattering loss.

In some configurations, the waveguide 700 may be formed by low resolution lithography. Such configurations may not require high resolution lithography, wet lithography, or sidewall oxidation, which may dramatically reduce fabrication costs. In addition, the configuration of the waveguide 700 may be relatively robust to processing errors or processing variations, such as variations in refractive index, layer thickness and gap control between silicon nitride and silicon. In some aspects, the waveguide 700 may be implemented in silicon waveguide-based multiplexers or demultiplexers, arrayed waveguide gratings, cascaded Mach-Zehnder interferometers, or other optical devices to significantly reduce phase errors.

In one example embodiment, an optical waveguide may include a silicon portion and a silicon nitride portion positioned over the silicon portion. The silicon portion may include a taper that decreases a width of the silicon portion. The silicon nitride portion may confine optical signals traveling through the optical waveguide in the silicon portion. The silicon nitride portion may extend along a length of the taper and may include a width that stays substantially the same along the length of the taper. The silicon portion may include a first width on a first side of the taper, and a second width on a second side of the taper opposite the first side. The taper may transition the optical waveguide between a loaded single mode or multimode waveguide to a single mode waveguide. The optical waveguide may transition between a loaded single mode or multimode waveguide to a single mode waveguide.

In some aspects, the silicon portion and the silicon nitride portion may be spaced apart from one another such that an optical mode in the silicon portion is confined laterally by the silicon nitride portion. The silicon portion and the silicon nitride portion may be spaced apart from one another. The silicon portion and the silicon nitride portion may extend substantially the same length of the optical waveguide. The taper may include a length that is sufficiently long enough to substantially avoid loss of optical signals travelling through the taper.

In some embodiments, the optical waveguide may include a bend positioned proximate the taper. The taper may change optical signals traveling through the optical waveguide from multimode to single mode to permit the optical signals to be routed through the bend. The silicon portion and the silicon nitride portion may extend through the bend. The taper may decrease a width of the silicon portion prior to the bend. The optical waveguide may include a buried oxide portion. The silicon nitride portion and the silicon portion may be positioned in the buried oxide portion.

In another example embodiment, an optical waveguide may include a transition between a loaded single mode or multimode waveguide to a single mode waveguide. The transition may include a silicon portion, a silicon nitride portion positioned over the silicon portion, and a taper decreasing a width of the silicon portion.

The optical waveguide may include a bend that changes the direction of the optical waveguide. The optical waveguide may include a second transition between a single mode waveguide to a loaded single mode or multimode waveguide. The second transition may include a second silicon portion, a second silicon nitride portion positioned over the silicon portion, and a second taper increasing a width of the second silicon portion. The silicon nitride portion may confine optical signals traveling through the optical waveguide in the silicon portion. The silicon nitride portion may extend along a length of the taper and may include a width that stays substantially the same along the length of the taper, and the length of the taper may be sufficiently long to substantially avoid loss of optical signals travelling through the taper.

The terms and words used in the description and claims are not limited to the bibliographical meanings, but, are merely used to enable a clear and consistent understanding of the disclosure. It is to be understood that the singular forms "a," "an," and "the" include plural referents unless the context clearly dictates otherwise. Thus, for example, reference to "a component surface" includes reference to one or more of such surfaces.

As used herein, an "electrical component" refers to a component that involves electricity, an "optical component" refers to a component that involves electromagnetic radiation (e.g., visible light or others), and an "optoelectronic component" refers to a component that involves both electrical signals and optical signals, and/or the conversion of electrical signals to optical signals, or vice versa.

By the term "substantially" it is meant that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

What is claimed is:

1. An optical waveguide comprising:
   a silicon portion including a taper that decreases a width of the silicon portion;
   a silicon nitride portion positioned over the silicon portion; and
   a bend positioned proximate the taper, wherein the taper changes optical signals traveling through the optical waveguide from multimode to single mode to permit the optical signals to be routed through the bend.

2. The optical waveguide of claim 1, wherein the silicon nitride portion confines optical signals traveling through the optical waveguide in the silicon portion.

3. The optical waveguide of claim 1, wherein the silicon nitride portion extends along a length of the taper and includes a width that stays substantially the same along the length of the taper.

4. The optical waveguide of claim 1, wherein the silicon portion includes a first width on a first side of the taper, and a second width on a second side of the taper opposite the first side, and the second width is smaller than a width of the silicon nitride portion.

5. The optical waveguide of claim 1, wherein the taper transitions the optical waveguide between a loaded single mode or multimode waveguide to a single mode waveguide.

6. The optical waveguide of claim 1, wherein the optical waveguide transitions between a loaded single mode or multimode waveguide to a single mode waveguide.

7. The optical waveguide of claim 1, wherein the silicon portion and the silicon nitride portion are spaced apart from one another such that an optical mode in the silicon portion is confined laterally by the silicon nitride portion.

8. The optical waveguide of claim 1, wherein the silicon portion and the silicon nitride portion are spaced apart from one another.

9. The optical waveguide of claim 1, wherein the silicon portion and the silicon nitride portion extend substantially the same length of the optical waveguide.

10. The optical waveguide of claim 1, the taper comprising a length that is sufficiently long enough to substantially avoid loss of optical signals travelling through the taper.

11. The optical waveguide of claim 1, wherein the silicon portion and the silicon nitride portion extend through the bend.

12. An optical waveguide comprising:
    a silicon portion including a taper that decreases a width of the silicon portion;
    a silicon nitride portion positioned over the silicon portion; and
    a bend, wherein the silicon portion and the silicon nitride portion extend through the bend, and the taper decreases a width of the silicon portion prior to the bend.

13. The optical waveguide of claim 1, further comprising a buried oxide portion, wherein the silicon nitride portion and the silicon portion are positioned in the buried oxide portion.

14. An optical waveguide comprising:
    a transition between a loaded single mode or multimode waveguide to a single mode waveguide, the transition comprising:
      a silicon portion;
      a silicon nitride portion positioned over the silicon portion; and
      a taper decreasing a width of the silicon portion;
    a bend positioned proximate the taper, wherein the taper changes optical signals traveling through the optical waveguide from multimode to single mode to permit the optical signals to be routed through the bend.

15. The optical waveguide of claim 14, wherein the bend changes the direction of the optical waveguide.

16. The optical waveguide of claim 14, further comprising a second transition between a single mode waveguide to a loaded single mode or multimode waveguide.

17. The optical waveguide of claim 16, the second transition comprising:
    a second silicon portion;
    a second silicon nitride portion positioned over the second silicon portion; and
    a second taper increasing a width of the second silicon portion.

18. The optical waveguide of claim 14, wherein the silicon nitride portion confines optical signals traveling through the optical waveguide in the silicon portion.

19. The optical waveguide of claim 14, wherein the silicon nitride portion extends along a length of the taper and includes a width that stays substantially the same along the length of the taper, and the length of the taper is sufficiently long to substantially avoid loss of optical signals travelling through the taper.

* * * * *